(12) United States Patent
Kang et al.

(10) Patent No.: US 7,142,723 B2
(45) Date of Patent: Nov. 28, 2006

(54) SYSTEM AND PROCESS FOR GENERATING HIGH DYNAMIC RANGE IMAGES FROM MULTIPLE EXPOSURES OF A MOVING SCENE

(75) Inventors: Sing Bing Kang, Redmond, WA (US); Matthew T. Uyttendaele, Seattle, WA (US); Simon Winder, Seattle, WA (US); Richard Szeliski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/623,033

(22) Filed: Jul. 18, 2003

(65) Prior Publication Data

US 2005/0013501 A1    Jan. 20, 2005

(51) Int. Cl.
*G06K 9/40* (2006.01)
*H04N 5/235* (2006.01)
(52) U.S. Cl. .................................. 382/254; 348/229.1
(58) Field of Classification Search ................ 382/162, 382/254, 274, 276, 284, 294, 295–296, 307; 348/229.1; 345/589, 629, 617, 648
See application file for complete search history.

(56) References Cited

U.S. PATENT DOCUMENTS

| | | | |
|---|---|---|---|
| 6,650,774 B1 * | 11/2003 | Szeliski | 382/169 |
| 6,687,400 B1 * | 2/2004 | Szeliski | 382/168 |
| 2003/0103670 A1 * | 6/2003 | Schoelkopf et al. | 382/162 |

OTHER PUBLICATIONS

Bergen, J.R., P. Anandan, K. J. Hanna, and R. Hingorani, Hierarchical model-based motion estimation, *Second European Conference of Computer Vision (ECCV '92)*, 1992, pp. 237-252.

Bogoni, L., Extending dynamic range of monochrome and color images through fusion, *Int'l Conf. on Pattern Recognition*, Sep. 2000, vol. 3, pp. 7-12.

Debevec, P. E., and J. Malik, Recovering high dynamic range radiance maps from photographs, *Proc. of SIGGRAPH '97*, Aug. 1997, pp. 369-378.

Durand, F., and J. Dorsey, Fast bilateral filtering for the display of high dynamic range images, *ACM Trans. on Graphics*, 2002, 21(3):249-256.

Fattal, R., D. Lischinshi, and M. Werman, Gradient domain high dynamic range compression, *ACM Trans. on Graphics*, 2002, 21(3):249-256.

Lucas, B. D., and T. Kanade, An interative image registration technique with an application in stereo vision, *Int'l Conf. on Artificial Intelligence*, 1981, pp. 674-679.

(Continued)

*Primary Examiner*—Kanjibhai Patel
(74) *Attorney, Agent, or Firm*—Lyon & Harr, LLP; Richard T Lyon

(57) ABSTRACT

A system and process for generating a high dynamic range (HDR) image from a bracketed image sequence, even in the presence of scene or camera motion, is presented. This is accomplished by first selecting one of the images as a reference image. Then, each non-reference image is registered with another one of the images, including the reference image, which exhibits an exposure that is both closer to that of the reference image than the image under consideration and closest among the other images to the exposure of the image under consideration, to generate a flow field. The flow fields generated for the non-reference images not already registered with the reference image are concatenated to register each of them with the reference image. Each non-reference image is then warped using its associated flow field. The reference image and the warped images are combined to create a radiance map representing the HDR image.

20 Claims, 7 Drawing Sheets

OTHER PUBLICATIONS

Mann, S., and R. W. Picard, On being "undigital" with digital cameras: Extending dynamic range by combining differently exposed pictures, *IS&T's 48th Annual Conference, Society for Imaging Science and Technology, Washington D.C.*, 1995, pp. 422-428.

Mann, S., C. Manders, and J. Fung, Painting with looks: Photographic images from video using quantimetric processing, *ACM Multimedia*, Dec. 2002.

Mitsunaga, T., and S. K. Nayar, Radiometric self calibration, *IEEE Conf. on Computer Vision and Pattern Recognition*, vol. 1, Jun. 1999, pp. 374-380.

Mitsunaga T., and S. K. Nayar, High dynamic range imaging: Spatially varying pixel exposure, *IEEE Conf. on Computer Vision and Pattern Recognition*, vol. 1, Jun. 2000, pp. 472-479.

Reinhard, E., M. Stark, P. Shirley, and J. Ferwerda, Photographic tome reproduction for digital images, *ACM Trans. on Graphics*, 2002, 21(3):267-276.

Tsin, Y., V. Ramesh, and T. Kanade, Statistical calibration of CCD imaging process, *Int'l Conf. on Computer Vision*, vol. 1, Jul. 2001, pp. 480-487.

* cited by examiner

Propagate warping to reference

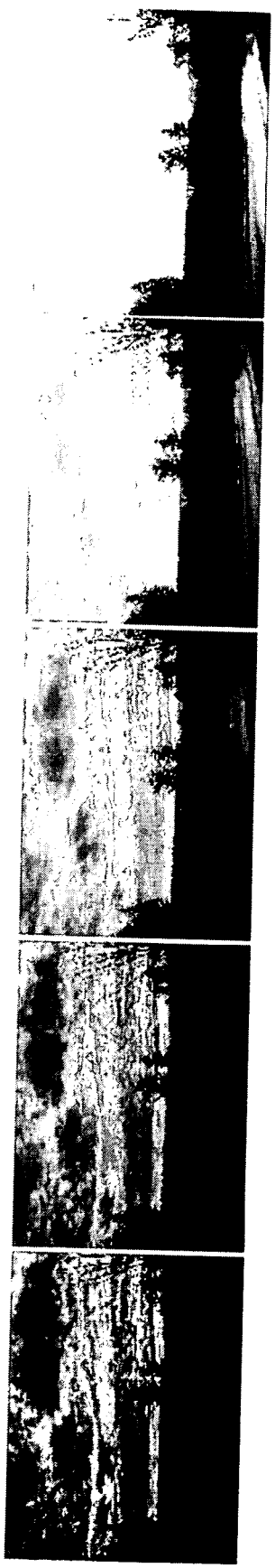
FIG. 6(a)
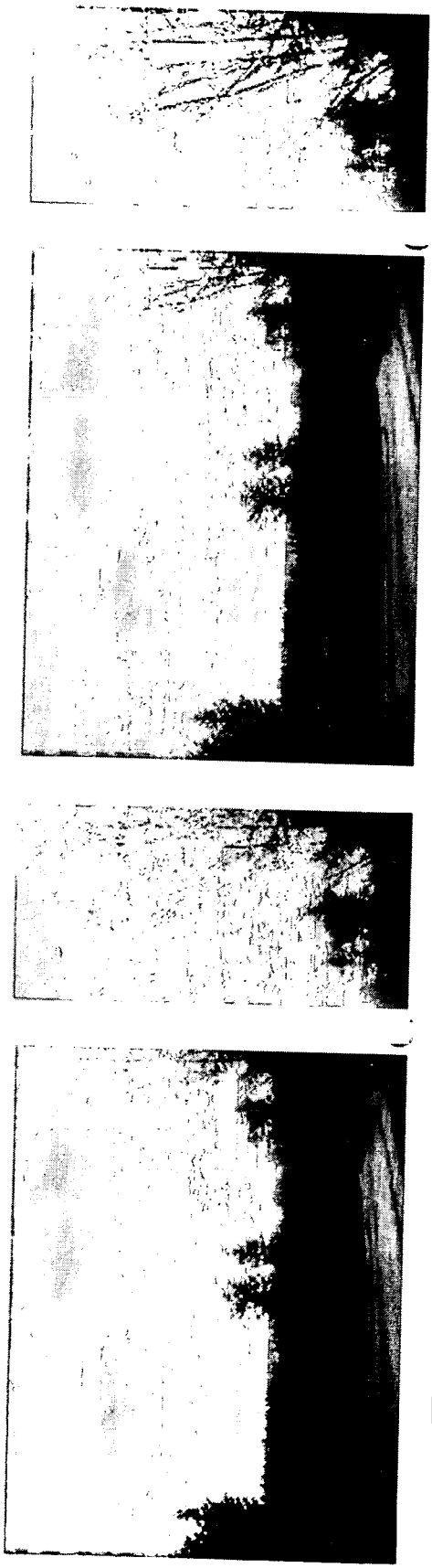
FIG. 6(b)
FIG. 6(c)
FIG. 6(d)
FIG. 6(e)

SYSTEM AND PROCESS FOR GENERATING HIGH DYNAMIC RANGE IMAGES FROM MULTIPLE EXPOSURES OF A MOVING SCENE

BACKGROUND

1. Technical Field

The invention is related to producing a High Dynamic Range (HDR) image from a series of bracketed images, and more particularly to a system and process for generating such HDR images, even in the presence of scene or camera motion between the images.

2. Background Art

The real world has a lot more brightness variation than can be captured by the sensors available in most cameras today. The radiance of a single scene may contain four orders of magnitude in brightness—from shadows to fully lit regions. Typical CCD or CMOS sensors only capture about 256–1024 brightness levels.

This limited dynamic range problem has inspired many solutions in recent years. One method of capturing the full radiance of a static scene is to take multiple exposures of the scene and then to combine them to create a High Dynamic Range (HDR) map [3, 7, 8, 9,12]. Because these technologies require multiple input images, there is a potential for motion between the inputs due to either dynamic elements in the scene or a moving (e.g., handheld) camera. Mitsunaga et al. [9] adddress this problem to a limited extent by fitting a global motion model to the inputs. Mann et al. [8] register differently exposed frames using homographies, which can compensate for larger camera rotations. Bogoni [2] uses affine motion followed by per-pixel flow to register different exposures, but details of the frame registration are not given.

The need to fuse images taken at different times can be eliminated (and thus eliminate the motion problem) using multiple image detectors, novel sensors or spatially varying pixel exposures [10]. However, the focus of the present invention is on what can be achieved using widely available conventional (i.e., low dynamic range) image sensors and cameras.

Once an HDR image is computed, it can then be rendered to a display. Since typical displays are only able to yield about two orders of magnitude in brightness values, a contrast reduction must be performed on the HDR image. This so-called tone mapping problem has recently been explored by a number of researchers [4, 5, 11].

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for generating high dynamic range (HDR) images from a bracketed image sequence of a scene, even in the presence of scene or camera motion between the images. This system and process involves first designating the image of the sequence having the greatest number of "valid" pixels as a reference image. A pixel is considered valid if it is not saturated and it exhibits an acceptable degree of contrast. In tested embodiments, the intensity of a pixel was measured in terms of 8-bit RGB color space values, and a pixel was deemed to be unsaturated and exhibiting the acceptable degree of contrast if each of its RGB values was within an interval. In tested versions of the present invention, the minimum and maximum of the interval were set at 17 and 254, respectively.

Once the reference image has been selected, each of the "non-reference" images in the sequence is registered with the reference image. In one embodiment of the present system and process, this is accomplished for each non-reference image by registering the image under consideration with the image of the bracketed sequence (including the reference image), which exhibits an exposure that is both closer to that of the reference image than the image under consideration and closest among the other images to the exposure of the image under consideration. This registration procedure generates a flow field for each of the non-reference images. In tested embodiments of the present invention, the registration involved computing a per-pixel optical flow field.

The flow fields generated for the non-reference images that are not already registered with the reference image, are concatenated to register each of them with the reference image. The concatenated flow fields, or the unmodified flow field in the case of the images originally registered directly with the reference image, are then used to warp each non-reference image. These warped images are then combined with the reference image to create a radiance map representing the HDR image. In cases where the HDR image is to be rendered and displayed using an 8-bit display, the radiance map undergoes a tone mapping procedure to convert it into an image suitable for the display by the system.

It is noted that, while not required, ideally the number of images in the bracketed sequence and the variation in the exposure among the images is such that the images collectively capture substantially all the brightness variation of the scene depicted therein.

In regard to computing per-pixel optical flow fields for the non-reference images, this can be accomplished in accordance with one embodiment of the present HDR image generation system and process as follows. For the case where the image under consideration has a shorter exposure than the other input image it is being registered with, the intensity of the image under consideration is boosted to substantially match the intensity range of the other image. Whereas, in the case where the image under consideration has a longer exposure than the other image it is being registered with, the intensity of that other image is boosted to substantially match the intensity range of the image under consideration. In either case, after the boosting procedure is complete, a flow field is computed that globally registers the image under consideration with the other input image by estimating a global transform that maps the image under consideration onto that other image. Then, a dense motion field is computed using a gradient based optical flow procedure. This produces a local correction to the flow field computed with the global transform. The corrected flow field is made up of a composite vector for each pixel location that is the sum of the global component derived from the global transform, and a local component taken from the dense motion field that forms the local correction for the global component. Any appropriate conventional global transform can be employed. In tested versions of the present invention, the global transform used was an affine transform.

The aforementioned procedure for computing the dense motion field that forms a local correction to the global transform involves employing a variant of the Lucas and Kanade technique used in a Laplacian pyramid framework. More particularly, the image under consideration is warped towards the other image of the sequence it is being registered with and the residual flow vectors are estimated at each level of the pyramid. These residual flow vectors are accumulated for each pixel at each level of the pyramid to establish the final local component of the dense motion field.

In regard to combining the reference image and warped images to create a radiance map, this can be accomplished in accordance with one embodiment of the present HDR image generation system and process as follows. First, the reference image and each warped image are converted to individual radiance images. A radiance value is then assigned to each pixel location in the radiance map. These radiance values can be either the radiance value associated with the reference image alone or a weighted combination of two or more radiance values taken from the corresponding pixel locations in the radiance images associated with the reference image and the warped images. In general, the decision will depend on which values are deemed to be trustworthy based on the intensity of the pixels.

More particularly, for each of pixel location of the reference image, it is first determined if the radiance values assigned to the corresponding location in the warped images are within a maximum allowable noise variance of the radiance value assigned to the pixel location of the reference image under consideration. If it is found that at least one of the radiance values assigned to the aforementioned corresponding location in the warped images is within the maximum allowable noise variance, then a weighted average of these radiance value(s) and that of the reference image is assigned as the radiance value for pixel location under consideration in the radiance map. If, however, it is found that none of the radiance values assigned to the corresponding location in the warped images are within the aforementioned maximum allowable noise variance, then the radiance value associated with the reference image alone is assigned as the radiance value for pixel location under consideration in the radiance map.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 6(a)–(e) depict the results of using the registration procedure according to the present invention in comparison to using a global registration technique, where FIG. 6(a) shows a series of five bracketed images of a sunrise scene, FIGS. 6(b) and (c) show the results of a global registration only of the images of FIG. 6(a), where FIG. 6(c) is a close-up view of the right side of FIG. 6(b), and FIGS. 6(d) and (e) show the results of a registration in accordance with the present invention, where FIG. 6(e) is a close-up view of the right side of FIG. 6(d).

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The HDR Image Generation Computing Environment

Figure 1:
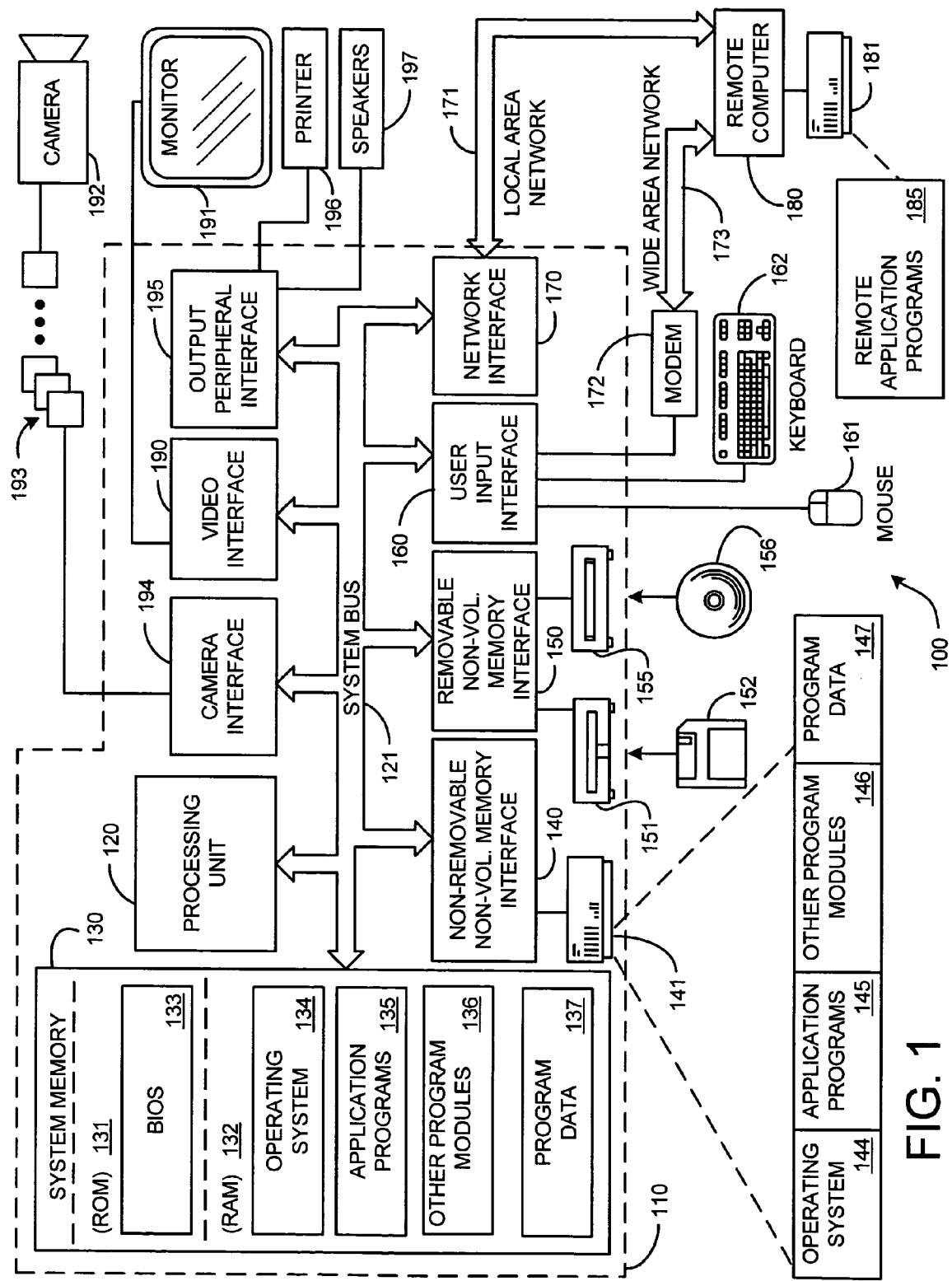
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The HDR Image Generation

The exemplary operating environment having now been discussed, the remaining part of this description section will be devoted to a description of the program modules embodying the invention. Generally, the system and process according to the present invention involves generating HDR images using a sequence of bracketed images, even if those images capture scene and camera movement.

2.1 The Input Image Sequence

As indicated above, the present HDR image generation system and process creates HDR images using bracketed exposures. Bracketing is term originally used in photography which referred to taking photographs of the same scene at multiple exposure settings in hopes of obtaining one with the optimum exposure level. In the context of the present invention, the term "bracketed" images generally means a set of images that were captured by a camera while varying the exposure level. One way to accomplish this is by using an auto-bracketing feature found in many still picture cameras today. When auto-bracketing a scene, the camera determines the correct exposure using the current metering mode and captures an image at that level. It then additionally captures more exposures at fixed multiples of the original exposure. For example, many of these cameras capture one image at a shorter exposure (e.g., at one or two f-stops up) and one image at a longer exposure (e.g., at one or two f-stops down), in comparison to the "correct exposure" image. It is noted that ideally the number of images in the bracketed sequence and the variation in the exposure among the images is such that the images collectively capture substantially all the brightness variation of the scene depicted therein. In this way the resulting HDR image will represent the full dynamic range of the scene.

Regardless of how the bracketed images are obtained, once input into the present system they are sorted according to exposure. The image with the most number of "valid" pixels is then chosen as the reference image. A pixel is considered "valid" if it is not saturated or of low contrast. One way of implementing this is to require that each "valid" pixel have RGB values within a prescribed interval. For example, in tested versions of the present invention, the minimum and maximum of the interval were set at 17 and 254, respectively.

Figure 2A:
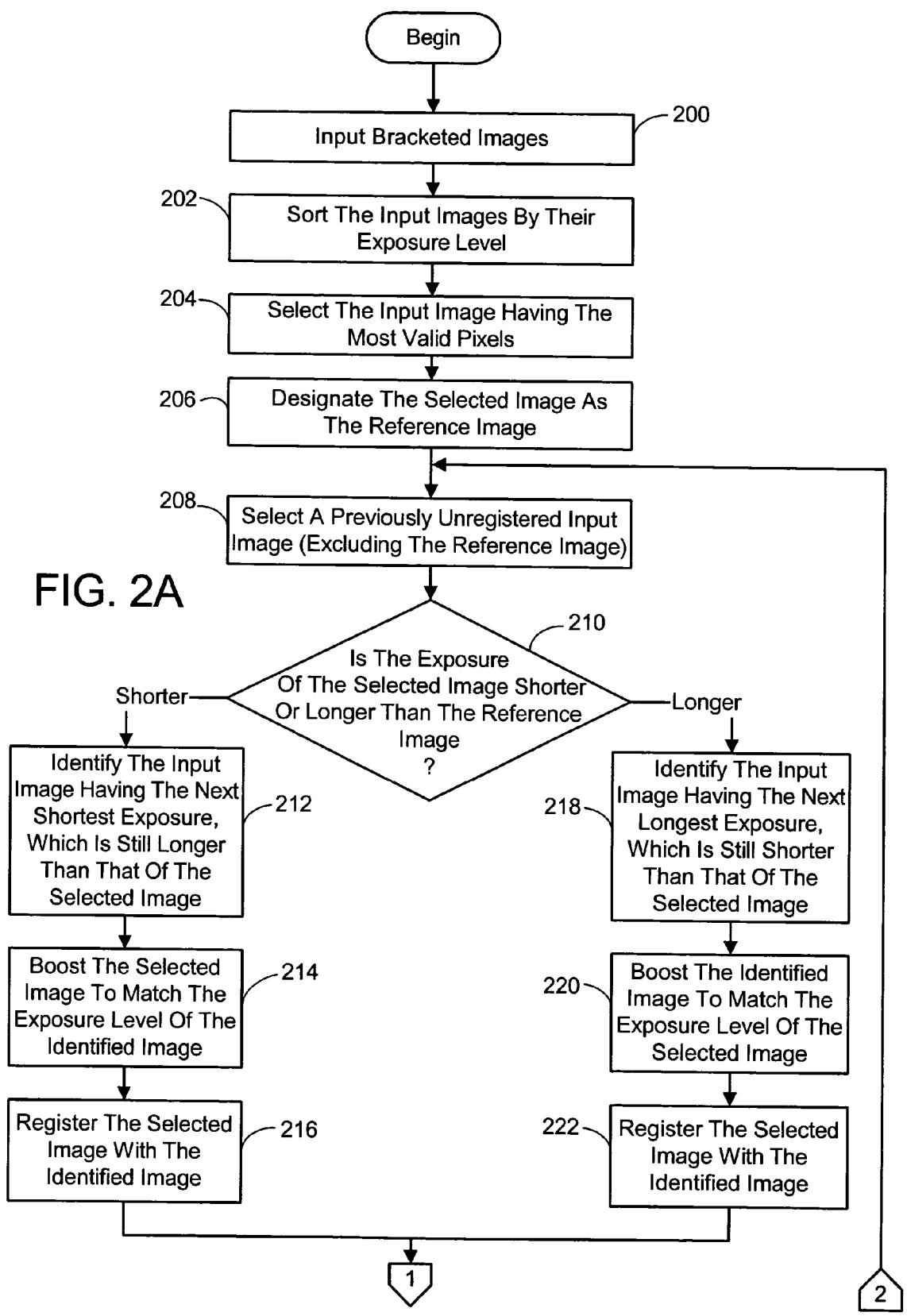
FIG. 2 is a flow chart diagramming an overall process for generating HDR images in accordance with the present invention.
Figure 2B:
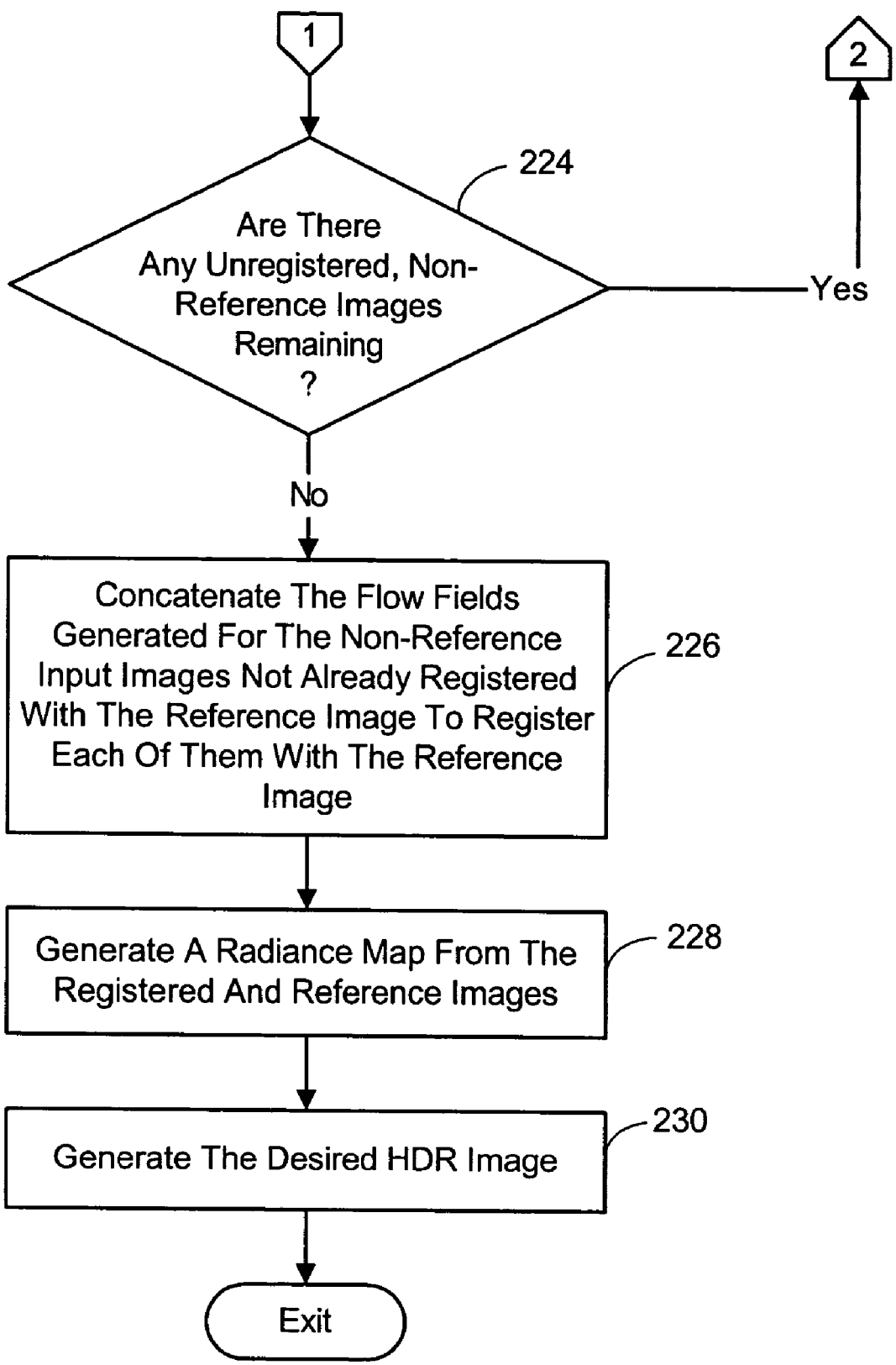
Figure 3A:
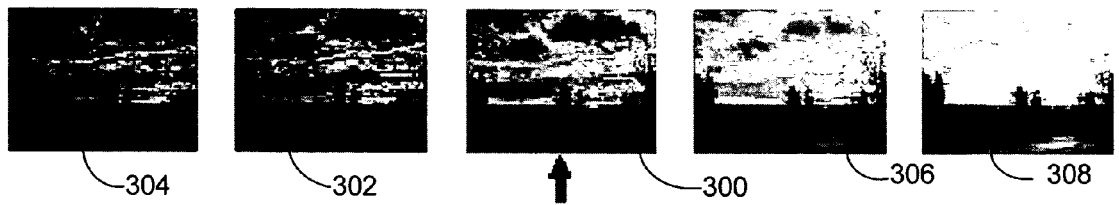
FIGS. 3(a)–(d) depict a series of five bracketed images of a sunrise scene, which have annotations showing how the images are manipulated by each part of the HDR image generation process of FIG. 2.

Thus, referring to FIGS. 2A and B, the HDR image generation process begins by inputting a sequence of bracketed images (process action 200). These images are then sorted by their exposure level (process action 202). For example, FIG. 3(a) shows a set of five bracketed images of a sunrise scene that have been sorted by exposure and displayed in a row. In this example, the image exhibiting the shortest exposure 304 is shown on the far left, with images increasing in exposure in a left to right sequence.

Thus the exposure exhibiting the longest exposure 308 is depicted in FIG. 3(a) on the far right. The HDR image generation process continues with the selection of the input image having the most valid pixels (process action 204) and its designation as the reference image (process action 206). In the example shown in FIG. 3(a), the middle image 300 of the row was found to have the most valid pixels and is marked by the arrow.

2.2 HDR Image Stitching

Since the bracketed input images exhibit varying exposures, generating an HDR image requires the transfer of pixel color information from the input images. This, in turn, requires that the pixel correspondences across the different input images be highly accurate. The process of computing the pixel correspondences, transferring color information and extracting the HDR image is referred to as HDR image stitching.

Figure 3B:
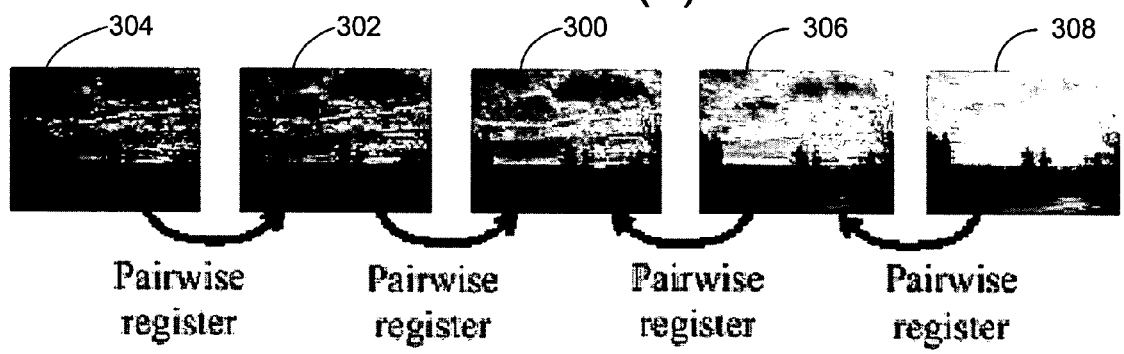

To accomplish this HDR stitching operation, each neighboring pair of the exposure-ordered input images is registered in the direction of the selected reference image. This is shown in FIG. 3(b), where the above-described bracketed image sequence of a sunrise is shown once again in the aforementioned exposure order. As is shown, the shortest exposure image 304 on the far left is registered with the image having the next shortest exposure level 302. In turn, that latter image 302 is registered with the reference image 300. Likewise, the image exhibiting the longest exposure 308 is registered with the image 306 having the next longest exposure level, which is in turn registered with the reference image 300. Neighboring pairs are chosen because they exhibit less visual change, which results in more robust registration. This series of pairwise registrations among the input images is accomplished using a warping process that will be described next.

2.2.1 Image Warping

The aforementioned pairwise registration procedure generally involves first boosting the shorter exposure image of the pair under consideration to match the longer exposure neighbor. Then, the image having the more outlying exposure (in relation to the selected reference image) is registered with the "closer" image via a warping process involving, in one embodiment, a global motion estimation followed by a local per-pixel flow computation.

More particularly, the HDR stitching process generates warped images. The images (S) having exposures shorter than the selected reference image (R) are registered with the immediately adjacent neighboring image having a longer exposure, which could be the reference image R itself, to produce a registered shorter exposure image ($S_U$), where the "U" subscript refers to it being a warped image. For convenience of notation the shorter exposure images will be given a subscript number i, where i=1, 2, 3, and so on, which indicates their exposure order. Specifically, the greater the subscript number i, the shorter the exposure is in relation to the reference image R. The resulting registered images $S_u$ will have corresponding subscript numbers.

The aforementioned image warping process is accomplished as follows. First, assume that the current input image under consideration was captured at a shorter exposure than the reference image, i.e., $S_i$. In an initial phase of the HDR stitching process, the shorter exposure image under consideration is boosted in intensity to substantially match the intensity range of the input image having the next shortest exposure, which could be the reference image itself. It is noted that shorter exposure images are boosted in intensity to match the longer exposure image to facilitate the registration process. It is preferable to boost the short exposure images rather than downscale the longer exposure image to prevent mismatch in pixel intensities in the saturated regions of the longer exposure frame. The short exposure images are boosted to match the loss of detail in the saturated regions in the long exposure images. It is also noted that boosted images are only used to compute a flow field, as will be explained. They are not used to compute the radiance map due to the noise and saturation introduced in the boosting process. To find the amount of intensity boosting required, the camera response function is used to convert the shorter exposed image to a radiance map, followed by a conversion to a virtual image having a longer exposure using the inverse response. This virtual image should match the pixel values (modulo discretization and noise) of the longer exposed image with which it is being registered.

A flow field $f_{Si}$ is computed next using a gradient based technique. In essence, this involves computing a dense motion match between the pair of images under consideration, and this is used to warp pixel information. More particularly, the procedure consists of two stages. First, the two images (i.e., the boosted shorter exposure image under consideration and its "less shorter exposure" neighbor) are globally registered by estimating a global transform that maps one onto the other. Any appropriate conventional global transform can be employed. In tested versions of the present invention, the global transform used was an affine transform. A gradient based optical flow is then used to compute a dense motion field that forms a local correction to the global transform. Thus, for each pixel, composite vectors are obtained that are the sum of global and local components. The global component is derived from the global warping parameters, and the local component is generated by an optical flow procedure that will be described next.

For the aforementioned local motion estimation, a variant of the Lucas and Kanade [6] technique is used in a Laplacian pyramid framework [1]. Techniques to handle degenerate flow cases can also be added by computing the eigenvalues of the matrix of summed partial derivatives and determining if it is ill-conditioned. Essentially, the image under consideration is progressively warped towards its neighboring image at each iteration and the residual flow vectors are estimated and accumulated down the pyramid. This technique is augmented by including the global affine flow during the warping so the accumulated residuals are always represented in terms of a local correction to the global flow. The result is the aforementioned flow field $f_{Si}$.

Similarly, the images (L) having exposures longer than the selected reference image (R) are registered with the immediately adjacent neighboring image having a "less long" exposure, which could be the reference image (R) itself, to produce a registered longer exposure image ($L_U$). For convenience of notation, the longer exposure images will also be given a subscript number i, where i=1, 2, 3, and so on, which indicates their exposure order. Specifically, the greater the subscript number i, the longer the exposure is in relation to the reference image. The resulting registered images $L_U$ will have corresponding subscript numbers.

In the case where the current input image under consideration was captured at a longer exposure, i.e., $L_i$, than the reference image, the aforementioned flow field calculation procedure is accomplished as follows. In the initial phase of the stitching procedure, the image having the next "less long" exposure to the longer exposure image under consideration (which could be the reference image itself is boosted in intensity to substantially match the intensity range of the image under consideration. Next, a flow field $f_{Li}$ is computed using the aforementioned gradient based technique. In this case, a dense motion match is computed between the longer exposure images, and this is used to warp pixel information. More particularly, for each pixel, composite vectors are obtained that are each the sum of global and local components. Here again, the global component is derived from the global warping parameters, and the local component is generated by an optical flow procedure described previously. The result is the aforementioned flow field $f_{Li}$.

Once the flow fields ($f_{Si}$ or $f_{Li}$) for each "non-reference" image have been computed, they are concatenated to permit each image to be registered directly with the reference image, with the exception of the shorter exposure and longer exposure image that have exposures closest to the reference image, i.e., $S_1$ and $L_1$. The flow fields for $S_1$ and $L_1$ remain as initially computed and the concatenated flows computed for the other non-reference images replace the previously computed flow fields. More particularly, given the flow fields, $f_{Si}$ and $f_{Li}$, where i=1, 2, . . . ,n , and where n is the number of shorter or longer exposure images as the case may be, a concatenated flow $f_{Sj}$ is computed for each image shorter exposure image other than $S_1$ as $f_{Sj}=f_{Sj}^* \ldots {}^*f_{S1}$, and a concatenated flow $f_{Lj}$ is computed for each longer exposure image other than $L_1$ as $f_{Lj}=f_{Lj}^* \ldots {}^*f_{L1}$, where j=2, . . . ,n.

Figure 3C:
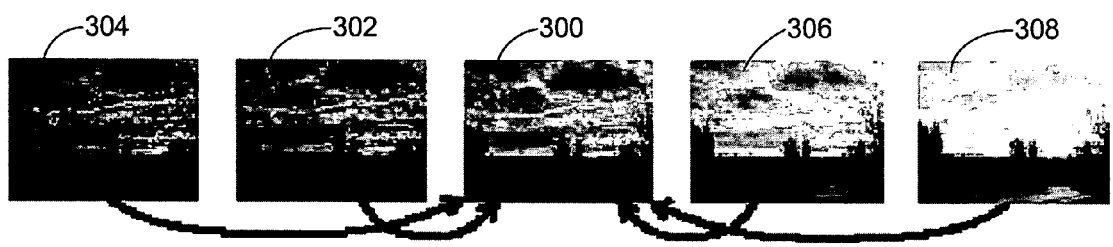

Each non-reference image is next warped using the flow field or concatenated flow field associated with it, as the case may be, to produce a set of registered or "stabilized" images $S'_i$ and $L'_i$. The foregoing procedure is shown graphically in FIG. 3(c) where it can be seen that the each non-reference image 302, 304, 306, 308 is registered directly with the reference image 300.

Thus, referring once again to FIGS. 2A and B, the pairwise registration procedure generally involves first selecting a previously unregistered input image, excluding the reference image (process action 208). It is then determined in process action 210 whether the selected image has an exposure that is shorter or longer than that of the reference image. If the selected image has a shorter exposure, then the input image having the next shortest exposure, which is still longer than that of the selected image, is identified (process action 212). It is noted that the identified image could be the reference image itself. The selected image is then boosted to match the exposure level of the identified image (process action 214). Once boosted, the selected image is registered with the identified image (process action 216) involving, in one embodiment, a global motion estimation followed by a local per-pixel flow computation. If, however, the selected image is found to have a longer exposure than the reference image, then the input image having the next longest exposure, which is still shorter than that of the selected image, is identified (process action 218). Here again, the identified image could be the reference image itself. In this case, the identified image is boosted to match the exposure level of the selected image (process action 220). Then, the selected image is registered with the identified image (process action 222). It is next determined whether there are any unregistered, non-reference images remaining (process action 224). If so, process actions 208 through 224 are repeated. If not, the flow fields generated for the non-reference input images that are not already registered with the reference image, are concatenated to register each of them with the reference image (process action 226). A radiance map is then recovered from the registered and reference images (process action 228). This radiance map is used to generate the desired HDR image (process action 230), which may involve a tonemapping procedure. The radiance map recovery and tonemapping procedures are described in the sections to follow.

2.2.2 Radiance Map Recovery

Figure 3D:
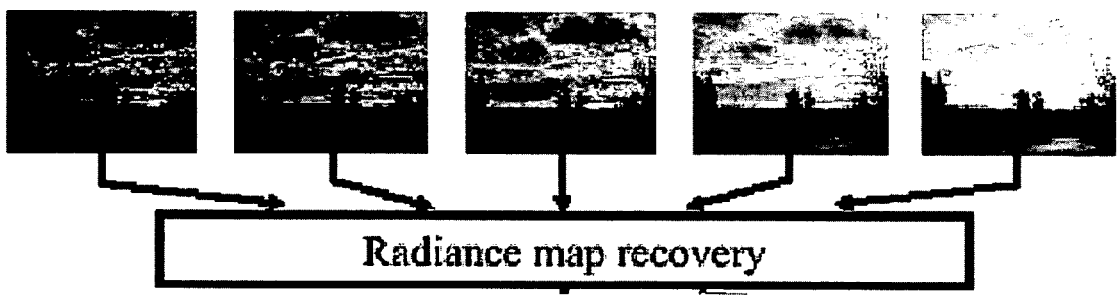
Figure 4A:
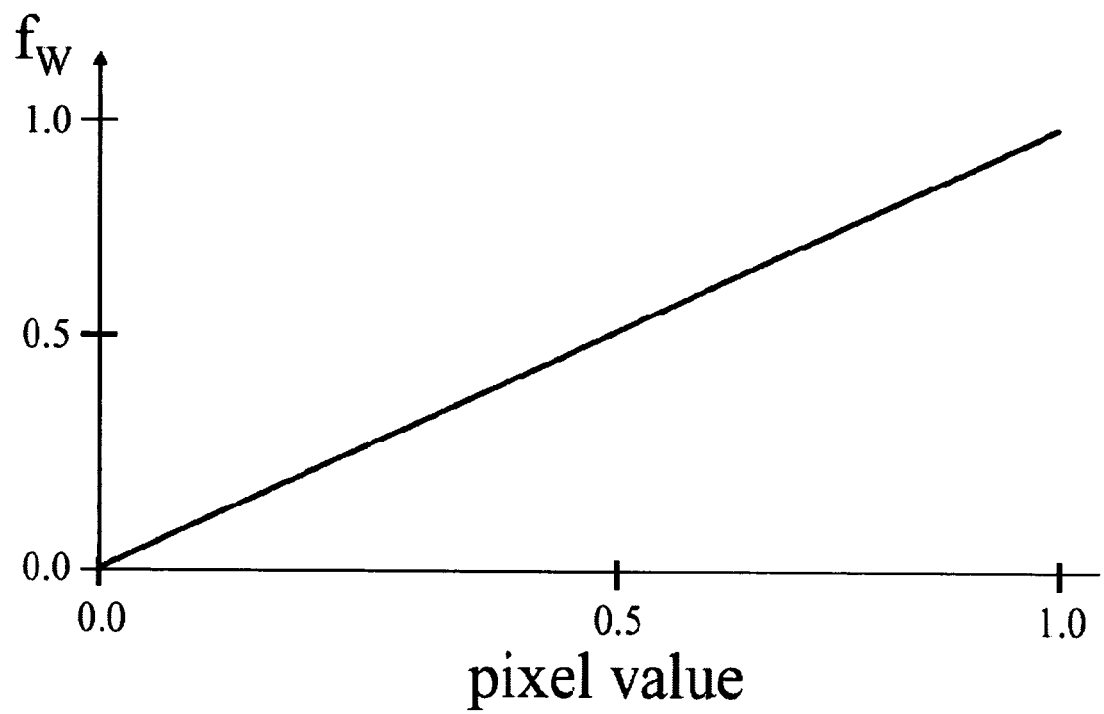
FIGS. 4(a)–(b) are graphs associated with the radiance map computation procedure of FIG. 2, where the graph of FIG. 4(a) plots global weight vs. intensity, and the graph of FIG. 4(b) plots the plausibility map based on radiance consistency of matched pixels.

The stabilized images and the reference image are used to recover the radiance map, as mentioned above. In essence, these images are combined to produce a radiance map, as shown in FIG. 3(d). Several techniques have been proposed to do this [3, 7, 9, 12]. In each of these techniques, the input images are converted to radiance images using the known exposure value and a computed camera response function. The final radiance value at a pixel is then computed as the weighted sum of the corresponding pixels in these radiance images. As indicated earlier, the response function of the camera $F_{response}$ is preferably computed using the technique of [9]. An example weighting function fw, derived from this technique is shown in FIG. 4(a) by a graph plotting global weight versus pixel intensity. It is noted, however, that existing approaches assume perfectly registered input images. Due to the possibility of mis-registrations in the first part of the HDR stitching process, perfect registration is not assumed in this part of the present process. Instead the procedure is made more tolerant to errors in pixel registration by using radiance values derived from the pixels of not only the reference image, but also the stabilized images as well. A logic protocol is employed which determines whether a pixel in the final radiance map is derived from the radiance value of one or a combination of two or more values taken from the corresponding pixels in the foregoing images. Generally, this decision is made based on the intensity of the pixel in the input image.

Figure 5:
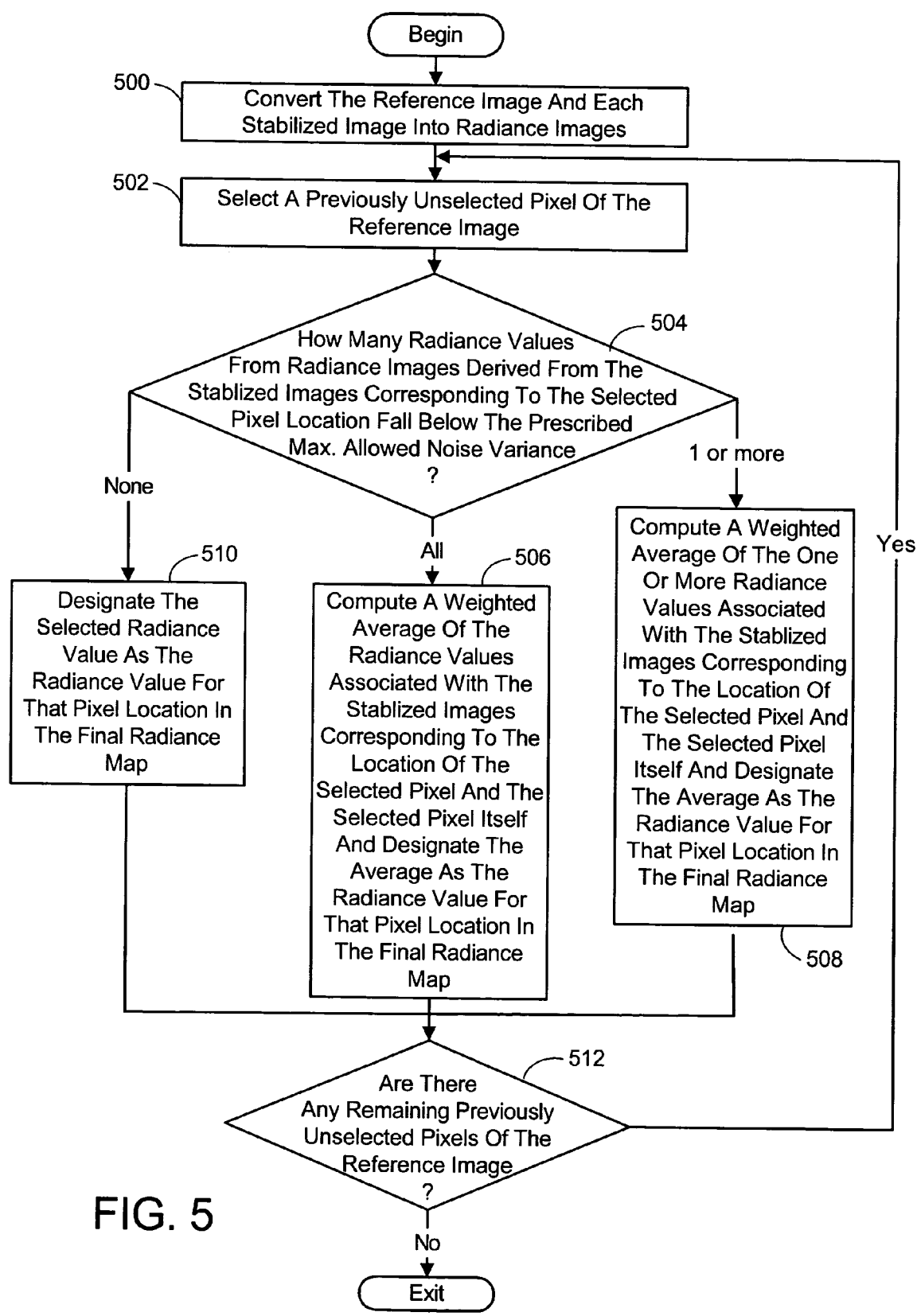
FIG. 5 is a flow chart diagramming one embodiment of the radiance map computation procedure of FIG. 2.

More particularly, referring to FIG. 5, the radiance map recovery employed in the HDR stitching is accomplished as follows. First, the reference image R, as well as each stabilized image $S'_i$ and $L'_i$, are converted into radiance images (process action 500) with the response function $F_{response}$ and the respective exposure values of the images using conventional methods, where in general, $$Rad = \frac{F_{response}^{-1}(p)}{\exp}$$

with Rad being the radiance of a pixel, p being the pixel intensity exp and exp being the exposure level. These radiance images are denoted by $\hat{R}$, $\hat{S}'_i$ and $\hat{L}'_i$ respectively. It is noted that in order to compute the aforementioned exposure it is necessary to know certain camera parameter settings employed when the bracketed images were captured. For example, it is typically necessary to know the shutter speed and aperture settings. To this end, it is possible to store this and any other desired camera parameter data as standard metadata information (e.g., EXIF tags) in the data associated with each of the images. This allows the radiance map computation to be automated.

Figure 4B:
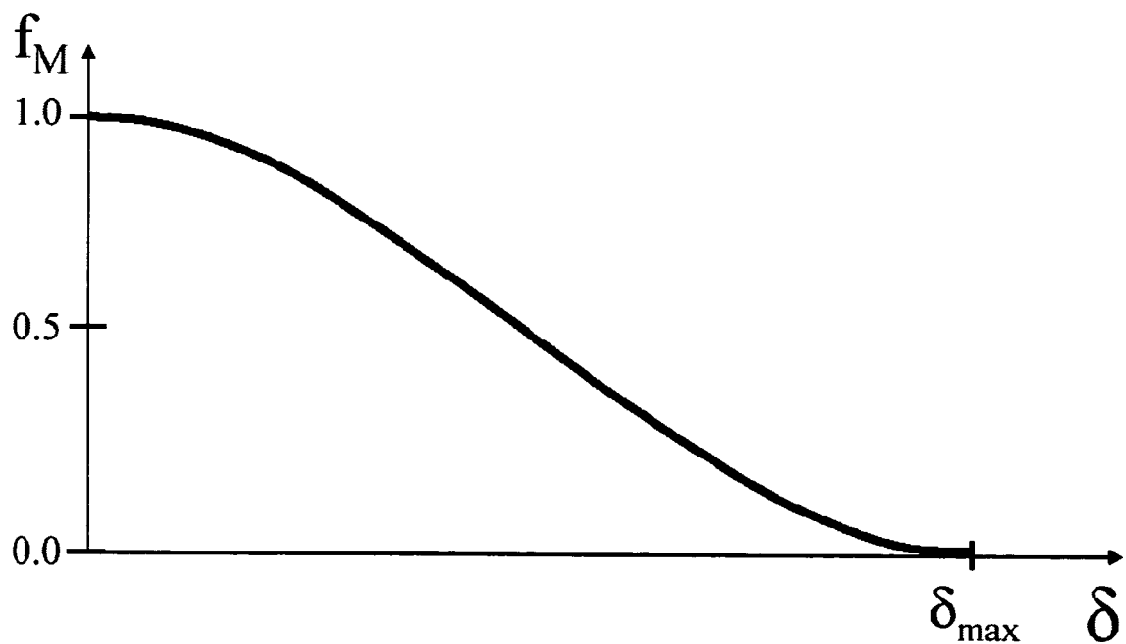

Next, a previously unselected pixel of the reference image R is selected (process action 502). The corresponding radiance values from each of the $\hat{S}'_i$ and $\hat{L}'_i$ images are then compared with the selected pixel of $\hat{R}$ to determine how many are below a prescribed maximum allowed noise variance in comparison to the radiance value of $\hat{R}$ (process action 504). If it is found that all the radiance values from the $\hat{S}'_i$ and $\hat{L}'_i$ images are below the prescribed maximum allowed noise variance, a weighted average of these and the value of the selected location in the reference image is computed and used as the radiance value for that pixel location in the final radiance map (process action 506). The weighted average radiance $R_{wavg}$ is computed as follows:

$$R_{wavg} = \frac{\begin{array}{c}f_{WM}(p_R, p_{S_1})p_{S_1}\ldots + \ldots f_{WM}(p_R, p_{S_n})p_{S_n} + \\ f_{WM}(p_R, p_{L_1})p_{L_1}\ldots + \ldots f_{WM}(p_R, p_{L_n})p_{L_n} + \\ f_W(p_R)p_R\end{array}}{\begin{array}{c}f_{WM}(p_R, p_{S_1})\ldots + \ldots f_{WM}(p_R, p_{S_n}) + \\ f_{WM}(p_R, p_{L_1})\ldots + \ldots f_{WM}(p_R, p_{L_n}) + f_W(p_R)\end{array}} \quad (1)$$

where $p_R$, $p_{Si}$ and $p_{Li}$ are corresponding pixels in the radiance images $\hat{R}$, $\hat{S}'_i$ and $\hat{L}'_i$. The weighting function $f_{WM}(q,p)=f_M(|p-q|) f_w(p)$ is the intensity-based weight function $f_w$ [9] modulated by a plausibility map $f_M$, where $f_M()$ is a Hermite Cubic defined by $$f_M(\delta) = \begin{cases} 2\left(\frac{\delta}{\delta_{max}}\right)^3 - 3\left(\frac{\delta}{\delta_{max}}\right)^3 + 1 & \text{if } \delta < \delta_{max} \\ 0 & \text{otherwise} \end{cases} \quad (2)$$

which downplays warped radiance values that are too different than the corresponding reference radiance value. $\delta_{max}$ is a user specified parameter that represents the aforementioned maximum allowed noise variance. In tested versions of the present radiance map recovery procedure, the maximum allowed noise variance was set to 16 intensity levels. An example of the modulation function is plotted in the graph shown in FIG. 4(b).

If, however, a radiance value from the $\hat{S}'_i$ and $\hat{L}'_i$ images is found to be above the maximum noise variance, it is thrown out and the radiance value used in the final radiance map for that pixel location is computed as the weighted average the value from $\hat{R}'_i$ and the remaining values from the $\hat{S}'_i$ and $\hat{L}'_i$ images (process action 508). This falls out of Eq. (2) because the terms involving the radiance value from the $\hat{S}'_i$ and $\hat{L}'_i$ images which are found to be outside the maximum allowed noise variance are zeroed. Thus, the weighted average is computed using Eq. (1) with the remaining radiance values.

Finally, if it is found that all the radiance values from the $\hat{S}'_i$ and $\hat{L}'_i$ images are outside the maximum allowed noise variance, then they are all thrown out in accordance with Eq. (2) and the radiance value used in the final radiance map for the selected pixel location is taken from $\hat{R}'_i$ directly (process action 510).

It is next determined in process action 512 if there are any pixels of the reference image that have not yet been selected and processed. If there are, process actions 502 through 512 are repeated. Otherwise the process ends.

2.3 Tone Mapping

Tone mapping is used to convert floating point radiance maps into an 8-bit representation suitable for rendering in typical electronic display systems or on paper. If such a system is going to be used to display the HDR image, tone mapping should be used to reduce the dynamic range of each HDR image while also maintaining a good contrast level for both brightly and darkly illuminated regions.

While any existing tone mapping procedure could be employed for this purpose, the present HDR image generation system makes use of the tone mapper presented by [11], which is based on the photographic technique of dodging and burning. In general, this tone mapping process begins by converting the radiance image to CIE space via conventional methods and recovering the chromaticity coordinates. The luminance image is then processed to compress the dynamic range. Finally, the chrominance is re-inserted and the CIE space image converted to produce the final byte-range RGB image. As part of this tone mapping process, certain global parameters have to be set to control the overall brightness balance. Essentially, a statistical analysis of the input image being tone mapped is performed to decide how to set these global parameters.

2.4 Results

The effectiveness of the foregoing HDR image generation system and process can be shown using the previously described bracketed image sequence of the sunrise (depicted here in FIG. 6(a)). Here there is both camera motion and cloud motion relative to the ground. Thus, the images capture scene motion. If a conventional global registration procedure (e.g., 2D perspective or homography) were employed to generate a composite HDR image, the result shown in FIGS. 6(b) and (c) are obtained (where (c) is a magnified version of the right side of (b)). However, if the present HDR image generation process is employed, a significantly better result is obtained as shown in FIGS. 6(d) and (e). Here, FIG. 6(e) is a magnified version of the right side of FIG. 6(d). Notice the crisper appearance of the tree branches in images 6(d) and (e).

3.0 References

[1] J. R. Bergen, P. Anandan, K. J. Hanna, and R. Hingorani. Hierarchical model-based motion estimation. In *Second European Conference of Computer Vision* (ECCV'92), pages 237–252, 1992.

[2] L. Bogoni. Extending dynamic range of monochrome and color images through fusion. *Int'l Conf. on Pattern Recognition*, vol. 3, pages 7–12, September 2000.

[3] P. E. Debevec and J. Malik. Recovering high dynamic range radiance maps from photographs. *Proc. of SIG-GRAPH 97*, pages 369–378, August 1997.

[4] F. Durand and J. Dorsey. Fast bilateral filtering for the display of high dynamic range images. *ACM Trans. on Graphics* (TOG), 21(3):257–266, 2002.

[5] R. Fattal, D. Lischinski, and M. Werman. Gradient domain high dynamic range compression. *ACM Trans. on Graphics*, 21(3):249–256, 2002.

[6] B. D. Lucas and T. Kanade. An iterative image registration technique with an application in stereo vision. In *Int'l Joint Conf on Artificial Intelligence*, pages 674–679, 1981.

[7] S. Mann and R. W. Picard. On being "undigital" with digital cameras: Extending dynamic range by combining differently exposed pictures. In *IS&T's 48th Annual Conference*, Society for Imaging Science and Technology, Washington D.C., pages 422–428,1995.

[8] S. Mann, C. Manders, and J. Fung. Painting with Looks: Photographic images from video using quantimetric processing. In *ACM Multimedia*, December 2002.

[9] T. Mitsunaga and S. K. Nayar. Radiometric self calibration. In *IEEE Conf on Computer Vision and Pattern Recognition*, volume 1, pages 374–380, June 1999.

[10] T. Mitsunaga and S. K. Nayar. High dynamic range imaging: Spatially varying pixel exposures. In *IEEE Conf on Computer Vision and Pattern Recognition*, volume1, pages 472–479, June 2000.

[11] E. Reinhard, M. Stark, P. Shirley, and J. Ferwerda. Photographic tone reproduction for digital images. *ACM Trans. on Graphics*, 21(3):267–276, 2002.

[12] Y. Tsin, V. Ramesh, and T. Kanade. Statistical calibration of CCD imaging process. In *Int'l Conf. on Computer Vision*,volume1,pages 480–487, July 2001.

What is claimed is:

1. A system for generating a high dynamic range (HDR) image from an image sequence of a scene captured while varying the exposure of each image, comprising:

a general purpose computing device;

a computer program comprising program modules executable by the computing device, wherein the computing device is directed by the program modules of the computer program to, designate the image having the greatest number of valid pixels as a reference image, wherein a pixel is valid if it is not saturated and it exhibits an acceptable degree of contrast, for each image except the reference image, register the image under consideration with the image, including the reference image, which exhibits an exposure that is both closer to that of the reference image than the image under consideration and closest among the images to the exposure of the image under consideration, to generate a flow field, concatenate the flow fields generated for the non-reference images not already registered with the reference image, to register each of them with the reference image, warp each non-reference image using the flow field associated therewith, and combine the reference image and the warped images to create a radiance map representing the HDR image.

2. The system of claim 1, further comprising a program module for tone mapping the radiance map to convert it into an 8-bit representation suitable for rendering.

3. The system of claim 2, wherein the program module for tone mapping the radiance map, comprises sub-modules for:

converting the radiance map to CIE space and recovering the chromaticity coordinates to produce a luminance image;

compressing the dynamic range of the luminance image and re-inserting the chrominance; and converting the CIE space image to produce the final 8-bit RGB image.

4. The system of claim 1, wherein the number of images in said sequence of images and the variation in the exposure among the images is such that the images collectively capture substantially all the brightness variation of the scene depicted in the images.

5. The system of claim 1, wherein the intensity of a pixel is measured in terms of 8-bit RGB color space values, and wherein a pixel is considered as being unsaturated and exhibiting the acceptable degree of contrast if each of its RGB values is within a prescribed interval.

6. The system of claim 5, wherein the prescribed interval is between, and including, 17 and 254.

7. The system of claim 1, wherein the sub-module for registering the image under consideration with the image exhibiting the exposure that is both closer to that of the reference image than the image under consideration and closest among the images to the exposure of the image under consideration, to generate a flow field, comprises sub-modules for:

whenever the image under consideration has a shorter exposure than the other input image it is being registered with, boosting the intensity of the image under consideration to substantially match the intensity range of said other input image, computing a flow field that globally registers the image under consideration with said other input image by estimating a global transform that maps the image under consideration onto that other image; and computing a dense motion field, which forms a local correction to the flow field computed with the global transform, using a gradient based optical flow; wherein the corrected flow field comprises a composite vector for each pixel location of the flow field which is the sum of (i) the global component derived from said global transform, and (ii) a local component taken from said dense motion field that forms the local correction for the global component.

8. The system of claim 7, wherein the sub-module for computing a dense motion field that forms a local correction to the global transform using a gradient based optical flow, comprises sub-modules for:

employing a variant of the Lucas and Kanade technique used in a Laplacian pyramid framework wherein the image under consideration is warped towards said other input image and the residual flow vectors are estimated at each level of the pyramid; and accumulating the residual flow vectors computed for each pixel at each level of the pyramid to establish said local component of the dense motion field.

9. The system of claim 1, wherein the sub-module for registering the image under consideration with the image exhibiting the exposure that is both closer to that of the reference image than the image under consideration and closest among the images to the exposure of the image under consideration, to generate a flow field, comprises sub-modules for:

whenever the image under consideration has a longer exposure than the other input image it is being registered with, boosting the intensity of said other image to substantially match the intensity range of the image under consideration, computing a flow field that globally registers the image under consideration with said other input image by estimating a global transform that maps the image under consideration onto that other image; and computing a dense motion field, which forms a local correction to the flow field computed with the global transform, using a gradient based optical flow; wherein the corrected flow field comprises a composite vector for each pixel location of the flow field which is the sum of (i) a global component derived from said global transform, and (ii) a local component taken from said dense motion field that forms the local correction for the global component.

10. The system of claim 9, wherein the sub-module for computing a dense motion field that forms a local correction to the global transform using a gradient based optical flow, comprises sub-modules for:

employing a variant of the Lucas and Kanade technique used in a Laplacian pyramid framework wherein the image under consideration is warped towards said other input image and the residual flow vectors are estimated at each level of the pyramid; and accumulating the residual flow vectors computed for each pixel at each level of the pyramid to establish said local component of the dense motion field.

11. The system of claim 1, wherein the program module for combining the reference image and warped images to create the radiance map, comprises sub-modules for:

converting the reference image and each warped image, respectively, to radiance images; and assigning a radiance value to each pixel location in the radiance map, wherein said radiance map radiance value is the radiance value assigned to the same pixel location in the radiance image associated with the reference image or a weighted combination of two or more radiance values taken from the corresponding pixel locations in the radiance images associated with the reference image and the warped images, depending on which values are deemed to be trustworthy based on the intensity of the pixel at that pixel location in the reference image.

12. A computer-implemented process for generating a high dynamic range (HDR) image from an image sequence of a scene captured while varying the exposure of each image, said process comprising using a computer to perform the following process actions:

inputting said images;

designating the input image having the greatest number of valid pixels as a reference image, wherein a pixel is considered valid if it is not saturated and it exhibits a prescribed degree of contrast;

for each input image except the reference image, identifying corresponding pixels between the image under consideration and another input image, including the reference image, which exhibits an exposure that is both closer to that of the reference image than the input image under consideration and closest among the input images to the exposure of the input image under consideration;

using the pixel correspondences identified between pairs of input images to establish a set of corresponding pixels among the input images for each pixel of the reference image; and for each set of corresponding pixels, identifying at least one pixel in the set that represents a trustworthy pixel and employing the pixel color information associated with the one or more identified trustworthy pixels to compute a radiance value for that set of pixels to form a radiance map representing the HDR image.

13. The process of claim 12, further comprising a process action of tone mapping the radiance map to convert it into an 8-bit representation suitable for rendering.

14. The process of claim 12, wherein the process action of identifying corresponding pixels between the image under consideration and said other input image, comprises an action of computing a flow field that registers that image with said other input image.

15. The process of claim 14, wherein the process action of using the pixel correspondences identified between pairs of input images to establish a set of corresponding pixels among the input images for each pixel of the reference image, comprises an action of concatenating the flow fields generated for the non-reference images not already registered with the reference image to register each of them with the reference image.

16. The process of claim 14, wherein the process action of, for each set of corresponding pixels, identifying at least one pixel in the set that represents a trustworthy pixel and employing the pixel color information associated with the one or more identified trustworthy pixels to compute a radiance value for that set of pixels to form a radiance map representing the HDR image, comprises the actions of:

converting the reference image and each warped image, respectively, to radiance images; and for each of pixel location of the reference image, determining if the radiance values assigned to the corresponding location in the warped images are within a maximum allowable noise variance of the radiance value assigned to pixel location of the reference image under consideration, whenever it is found that at least one of the radiance values assigned to said corresponding location in a warped image is within the maximum allowable noise variance of the radiance value assigned to the pixel location in the reference image under consideration, computing a weighted average of radiance values assigned to the pixel location of the reference frame under consideration and said corresponding pixel location in the warped images whose radiance values fell within the maximum allowable noise variance, and assigning the weighted average as the radiance value for the pixel location under consideration in the radiance map, and whenever it is found that none of the radiance values assigned to said corresponding locations in the warped images are with the maximum allowable noise variance of the radiance value assigned to the pixel location in the reference image, assigning the radiance value assigned to the pixel location under consideration in the reference image as the radiance value for the pixel location under consideration in the radiance map.

17. The process of claim 16, wherein the process action of computing a weighted average of radiance values assigned to the pixel location of the reference frame under consideration and said corresponding pixel location in the warped images whose radiance values fell within the maximum allowable noise variance, comprises an action of computing the weighted average radiance as $$R_{wavg} = \frac{f_{WM}(p_R, p_{S_1})p_{S_1} \ldots + \ldots f_{WM}(p_R, p_{S_n})p_{S_n} + f_{WM}(p_R, p_{L_1})p_{L_1} \ldots + \ldots f_{WM}(p_R, p_{L_n})p_{L_n} + f_W(p_R)p_R}{f_{WM}(p_R, p_{S_1}) \ldots + \ldots f_{WM}(p_R, p_{S_n}) + f_{WM}(p_R, p_{L_1}) \ldots + \ldots f_{WM}(p_R, p_{L_n}) + f_W(p_R)},$$

wherein $p_R$, $P_{si}$ and $p_{Li}$ are corresponding pixels in the radiance images with subscript R referring to the radiance image associated with the reference image, subscript $S_i$ referring to the radiance images associated with each of the warped images having an exposure shorter than the reference image and subscript $L_i$ referring to the radiance images associated with each of the warped images having an exposure longer than the reference image, and wherein the weighting function $f_{WM}(q,p) = f_M(|p-q|)f_w(p)$ is an intensity-based weight function $f_w$ modulated by a plausibility map $f_M$, where $f_M()$ is a Hermite Cubic defined by $$f_M(\delta) = \begin{cases} 2\left(\frac{\delta}{\delta_{max}}\right)^3 - 3\left(\frac{\delta}{\delta_{max}}\right)^2 + 1 & \text{if } \delta < \delta_{max} \\ 0 & \text{otherwise} \end{cases}$$

and $\delta_{max}$ is a prescribed parameter, such that the modulated weight of a radiance value associated with a warped image that is outside said maximum allowable noise variance is set to zero when calculating the weighted average radiance.

18. A computer-readable medium having computer-executable instructions for generating a high dynamic range (HDR) image from a sequence of bracketed images, said computer-executable instructions comprising:

(a) inputting said bracketed images;
(b) sorting the input images in the order of their exposures;
(c) designating the input image having the greatest number of valid pixels as a reference image, wherein a pixel is valid if it is not saturated and it exhibits a prescribed degree of contrast;
(d) selecting a previously unregistered non-reference input image;
(e) determining whether the selected input image has an exposure that is shorter or longer than the reference image;
(f) whenever the selected input image has an exposure that is shorter than the reference image,
identifying the input image having the next shortest exposure that is still longer than the selected input image, which could be the registered image,
boosting the selected image to match the exposure of the identified image,
registering the boosted selected image with the identified image, to generate a flow field for the selected image;
(g) whenever the selected input image has an exposure that is longer than the reference image,
identifying the input image having the next longest exposure that is still shorter than the selected input image, which could be the registered image,
boosting the identified image to match the exposure of the selected image,
registering the selected image with the boosted identified image, to generate a flow field for the selected image;
(h) determining if there are any remaining unregistered non-reference input images, and if so repeating instructions (d) through (h) until all the non-reference images have been registered;
(i) concatenating the flow fields generated for the non-reference input images not already registered with the reference image to register each of them with the reference image;
(j) warping each non-reference input image using the flow field, or concatenated flow field if one, associated therewith; and
(k) combining the reference image and the warped images to create a radiance map representing the HDR image.

19. The computer-readable medium of claim 18, further comprising an instruction for tone mapping the radiance map to convert it into an 8-bit representation suitable for rendering.

20. The computer-readable medium of claim 18, wherein the intensity of a pixel is measured in terms of 8-bit RGB color space values, and wherein a pixel is considered as being unsaturated and exhibiting the acceptable degree of contrast if each of its RGB values is between, and including, 17 and 254.

* * * * *